No. 711,565. Patented Oct. 21, 1902.
J. W. HARRIS.
MANUFACTURE OF ETHER.
(Application filed June 5, 1902.)
(No Model.)
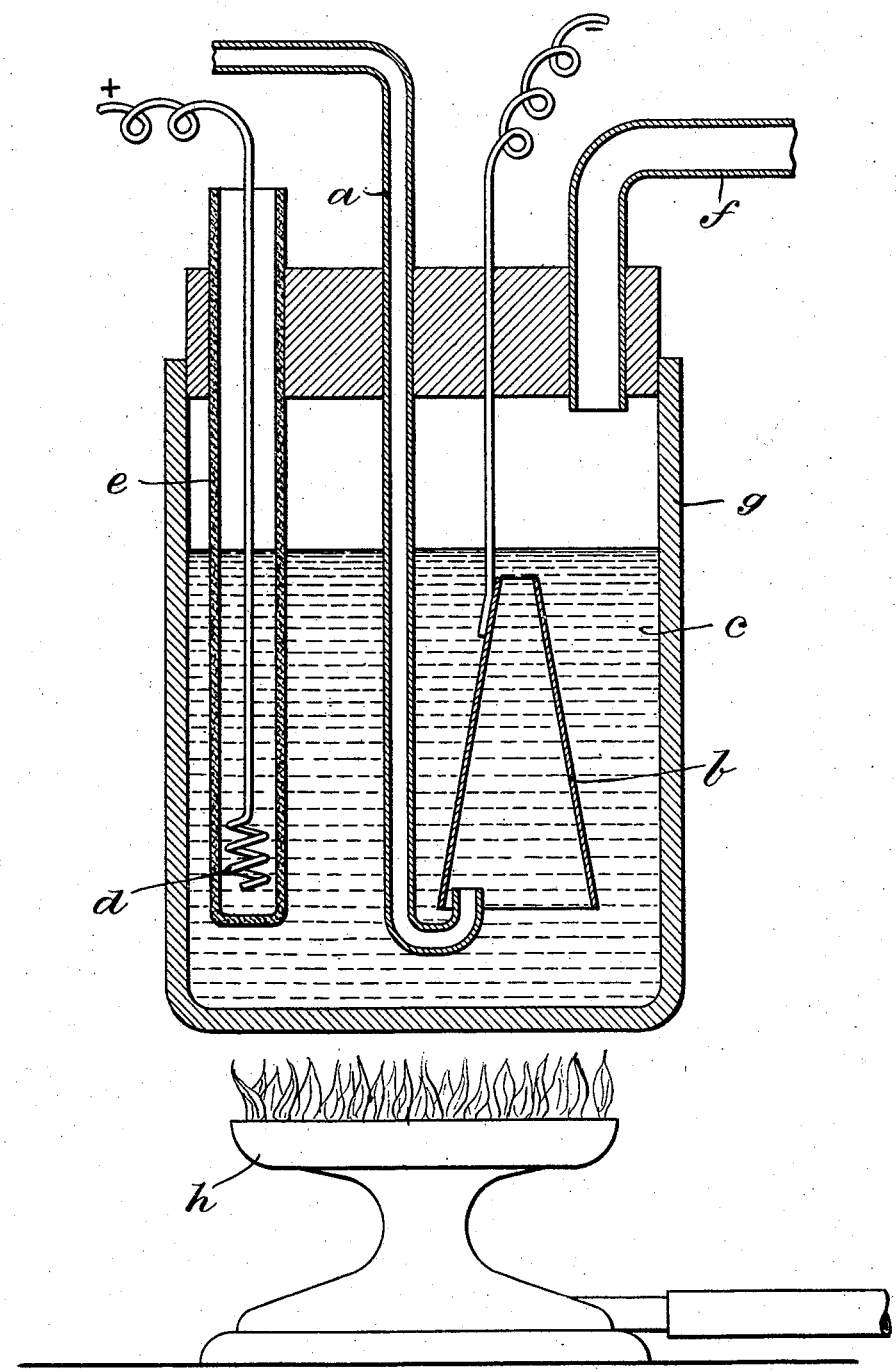

UNITED STATES PATENT OFFICE.

JOSEPH W. HARRIS, OF ASHBOURNE, PENNSYLVANIA.

MANUFACTURE OF ETHER.

SPECIFICATION forming part of Letters Patent No. 711,565, dated October 21, 1902.

Application filed June 5, 1902. Serial No. 110,353. (No specimens.)

*To all whom it may concern:*

Be it known that I, JOSEPH W. HARRIS, a citizen of the United States, residing at Ashbourne, in the county of Montgomery and State of Pennsylvania, have invented certain new and useful Improvements in the Manufacture of Ether, of which the following is a specification.

Hitherto ether has been manufactured by introducing alcohol into a hot solution of sulfuric acid, in which a chemical reaction takes place, resulting in the formation of ethyl-sulfuric acid, as expressed by the equation $$C_2H_5OH + H_2SO_4 = C_2H_5OSO_2OH + H_2O$$

and upon further addition of alcohol another chemical reaction occurred with the ethyl-sulfuric acid, resulting in the formation of ether and sulfuric acid, as expressed by the equation $$C_2H_5OSO_2OH + C_2H_5OH = (C_2H_5)_2O + H_2SO_4;$$

but owing to the high cost of alcohol the manufacture of ether by such a method has long been regarded as expensive, and many efforts have been made in the past to economize in its production.

My invention has for its principal objects, first, to produce ether without having to employ alcohol in its production; second, to produce ether direct from acetylene; third, to produce ether by the direct action of hydrogen generated by a suitable agent in the presence of acetylene; fourth, in the production of ether, first forming ethylene by the direct action of hydrogen developed by electrolysis in the presence of acetylene; fifth, to produce ether by the direct action of hydrogen developed by electrolysis to form ethylene in the presence of acetylene and by reaction converted into the ether, and, sixth, to provide a comparatively simple, reliable, and efficient method of producing ether by subjecting acetylene to the direct action of hydrogen developed by electrolysis to form ethylene, then combining the ethylene with the acid of the cell under a suitable temperature to form ethyl-sulfuric acid, and then by decomposition producing ether.

My invention, stated in general terms, consists of the manufacture of ether direct from acetylene.

In the accompanying drawing is illustrated in vertical section an electrolytic cell in one form for effecting reactions of the mass in the electrolyte; but other types of cells may be used and also electrodes of different metals and even mercury to allow the acetylene to bubble through it and good results be obtained.

Referring to the drawing, the acetylene gas enters by the tube $a$ and bubbles through the electrolyte $c$, composed of dilute sulfuric acid or other preferred acid substance or materials and passes then over the surface of the cathode $b$, where it combines with the nascent hydrogen liberated by electrolysis to form ethylene, as set out in the equation hereinafter set forth. The anode $d$ is surrounded by a tube or porous cup $e$ to prevent the oxidation of the ethyl-sulfuric acid formed by the absorption of the ethylene. The cell $g$ is heated by any convenient means, such as a burner $h$, to the required temperature. The distillate from the cell $g$ passes off through the tube $f$ to a second electrolytic cell or to others, if required.

Acetylene has been transformed into ethylene by the action of hydrogen generated by zinc and sulfuric acid and by other methods, such as by the action of zinc and ammonia on copper acetylide; also, by passing acetylene and hydrogen through red-hot tubes; also, by the action of nascent hydrogen generated in contact with acetylene gas by a fused mixture of calcium and calcium carbid, and also by the action of acetylene gas on an ammoniacal solution of chromous sulfate; but it has not up to the present time been transformed into ethylene by the direct action of nascent hydrogen generated by electricity in the presence of the acetylene in an electrolytic cell. When acetylene gas is passed over the cathode of an electrolytic cell, the acetylene combines with the nascent hydrogen liberated by the electric current to form ethylene and ethane, thus—

$$C_2H_2 + H_2 = C_2H_4; \quad C_2H_4 + H_2 = C_2H_6.$$

It is important that the production of ethane be restricted as much as possible.

The electrolyte used may consist of sulfuric acid containing up to about thirty-five per cent. of water. As electrolysis proceeds the water is decomposed into its elements, the hydrogen acting on the acetylene, and the oxygen is carried off by the anode. Water may be supplied to the acid from time to time, as required, or continuously, if preferred, or the acetylene gas may be saturated with water-vapor to replace any lost by electrolytic decomposition and to assist in subsequent chemical reactions. The ethylene formation takes place in the strong sulfuric acid and at once combines with it to form ethyl-sulfuric acid—

$$C_2H_4 + H_2SO_4 = C_2H_5OSO_2OH,$$

and this combination takes place preferably at a temperature above 100° centigrade.

The ethyl-sulfuric acid decomposes into products which vary with the temperature and the quantity of water present. When the water content exceeds fifty per cent., alcohol is generated. As the water content decreases the per cent. of alcohol generated decreases, while that of ether begins. The alcohol formation grows less and less as the water content becomes smaller. The ether formation continues until the water present becomes less than ten per cent. It may be here remarked that above 145° centigrade sulfur dioxid is given off. This formation of ether, as has been demonstrated, is due to the reaction between the two molecules of ethyl-sulfuric acid and of the one of water, as expressed by the equation $$2C_2H_5OSO_2OH + H_2O = (C_2H_5)_2O + H_2SO_4,$$

the electric current assisting this to take place. It is possible, also, that the reaction between a molecule of ethyl-sulfuric acid and the one of water, forming alcohol and sulfuric acid, the alcohol then combining with ethyl-sulfuric acid, forming ether and sulfuric acid, also takes place, as expressed by the equations $$C_2H_5OSO_2OH + H_2O = C_2H_5OH + H_2SO_4.$$

$$C_2H_5OSO_2OH + C_2H_5OH = (C_2H_5)_2O + H_2SO_4.$$

It may be remarked, however, that when the water content is less than fifty per cent. the formation of the alcohol decreases, while that of the ether commences, indicating that the reaction between the two molecules of ethyl-sulfuric acid and of the one of water first given is the more probable.

All chemical changes take place in the mass of the electrolyte. The vapors distilling over, as hereinbefore explained, may be passed through a second and even a third electrolytic cell, where any unchanged acetylene will be changed to ethylene and the chemical reactions taking place in the first cell being repeated.

Having thus described the nature and objects of my invention, what I claim as new, and desire to secure by Letters Patent, is—

1. The manufacture of ether from acetylene, which consists in forming a chemical union of acetylene gas with hydrogen by an agent having the property of developing the hydrogen, combining the compound resulting therefrom with an acid and then forming by decomposition, under required temperature, ether, substantially as described.

2. The manufacture of ether direct from acetylene through the action of hydrogen by an agent having the property of not only liberating the hydrogen but of also forming a compound, which through decomposition, is formed into ether.

3. The manufacture of ether, which consists in subjecting acetylene to the direct action of hydrogen in an electrolytic cell to form ethylene and the ethylene combining with the acid of the cell under suitable temperature to form ethyl-sulfuric acid and then by decomposition converting the compound into ether.

4. The manufacture of ether direct from acetylene through the action of hydrogen generated electrically to form ethylene, then combining the ethylene with sulfuric acid under required temperature to form ethyl-sulfuric acid and then combining the ethyl-sulfuric acid with water, substantially as and for the purposes described.

In testimony whereof I have hereunto set my signature in the presence of two subscribing witnesses.

JOSEPH W. HARRIS.

Witnesses:
 J. WALTER DOUGLASS,
 THOMAS M. SMITH.